United States Patent
Jernström

(12) 
(10) Patent No.: US 6,309,018 B1
(45) Date of Patent: Oct. 30, 2001

(54) BACK SUPPORT STRUCTURE FOR A SEAT

(75) Inventor: Clas Jernström, Askim (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/254,561

(22) PCT Filed: Sep. 9, 1996

(86) PCT No.: PCT/SE96/01118

§ 371 Date: Mar. 8, 1999

§ 102(e) Date: Mar. 8, 1999

(87) PCT Pub. No.: WO98/09554

PCT Pub. Date: Mar. 12, 1998

(51) Int. Cl.[7] ............................................. B60N 2/66
(52) U.S. Cl. ............................... 297/284.1; 297/284.4
(58) Field of Search ........................... 297/284.1, 284.4, 297/452.63

(56) References Cited

U.S. PATENT DOCUMENTS

| | | | |
|---|---|---|---|
| 2,843,195 | * 7/1958 | Barvaeus | 297/284.4 |
| 4,621,886 | * 11/1986 | Zani | 297/452.63 X |
| 4,798,414 | * 1/1989 | Hughes | 297/452.63 |
| 4,968,093 | * 11/1990 | Dal Monte | 297/284.4 |
| 5,120,109 | 6/1992 | Rangoni . | |
| 5,316,371 | * 5/1994 | Bishai | 297/284.1 X |

FOREIGN PATENT DOCUMENTS 0 291 298 A1  11/1988 (EP) .

* cited by examiner

Primary Examiner—Peter R. Brown
(74) Attorney, Agent, or Firm—Kilpatrick Stockton LLP

(57) ABSTRACT

Seat back supports are disclosed including a seat frame, a deformable support surface mounted on the seat frame comprising juxtaposed strips pivotally mounted with respect to each other, and plates for maintaining the deformable support surface in a predetermined orientation, the plates being movable between a first position engaging the juxtaposed strips to maintain the deformable support surface in the predetermined orientation and a second position in which the plate is disengaged from the deformable support surface which is then movable into a different orientation.

12 Claims, 4 Drawing Sheets

BACK SUPPORT STRUCTURE FOR A SEAT

FIELD OF THE INVENTION

The present invention relates to a back support structure for a seat. More particularly, the present invention relates to a back support structure for a vehicle seat.

BACKGROUND OF THE INVENTION

A back support structure for a seat is known from European Patent Application No. 291,298. This application describes a seat measuring apparatus and a chair with an adjustable back, in which the adjustable back portion is formed by a pliable surface to which a number of metal strips can be attached. In order to obtain a curvature corresponding to that of a person's back, so as to allow measurement thereof, the deformable surface is provided with three supports allowing adjustment. Between the support locations the deformable surface is unrestrained by any positive means.

When considering the dynamics of vehicle collisions, and means for minimizing back and neck injuries, it is known that correct support of the back is very important, particularly as concerns the upper back, shoulders, neck and head. However, a seat back must also be easily adjustable in order to make it viable for use by people of different sizes. This is particularly true in vehicle seats which are standard for any particular car model. When considering a seat according to European Patent Application No. 291,298 (which primarily concerns a seat measurement apparatus and its application to a chair), obtaining conformity to a user's back is very complicated, requiring a large number of manipulations. Moreover, the assistance of a further person while the user is seated is required, if accurate conformity is to be obtained.

A known seat is disclosed in U.S. Pat. No. 5,120,109, which describes a standard car seat having several adjustable control sections, with a separate headrest portion attached by means of a control at the upper edge of the seat. Each of the adjustable sections comprises a panel having a number of parallel cords with intersecting cables which can be deformed into convex orientations of varying degrees of curvature. Such a seat does not, however, allow sufficient conformity to the actual shape of a user's back, but merely offers a compromise by supporting certain areas of the back by means of a series of standard convex surfaces which may or may not fit various users.

The main object of the present invention is thus to provide a seat back which is readily adjustable to provide good conformity, yet which provides positive support for the deformable support surface so as to provide a stable seat back structure.

SUMMARY OF THE INVENTION

In accordance with the present invention, this and other objects have now been realized by the discovery of a seat back support comprising a seat frame, a deformable support surface having an upper edge and a lower edge, the upper edge being mounted on the seat frame, the deformable support surface comprising a plurality of juxtaposed strips pivotally mounted with respect to each other, and holding means for maintaining the deformable support surface in a predetermined orientation, the holding means being movable between a first position wherein the holding means engages the plurality of juxtaposed strips to maintain the deformable support surface in the predetermined orientation and a second position wherein the holding means is disengaged from the deformable support surface and the deformable support surface is movable into a different orientation. In a preferred embodiment, the deformable support surface includes an upper portion and a lower portion, the upper portion being deformable in a convex configuration away from the seat frame to provide support for the head of an occupant in the seat.

In accordance with one embodiment of the seat back support of the present invention, the plurality of juxtaposed strips includes substantially vertical edge portions, the holding means adapted to engage the substantially vertical edge portions in the predetermined orientation. In a preferred embodiment, the holding means comprises at least one plate having a high friction surface disposed thereon facing at least one of the substantially vertical edge portions.

In accordance with another embodiment of the seat back support of the present invention, the seat back support includes biasing means for biasing the holding means into the first position, and actuation means for moving the holding means into the second position.

In accordance with one embodiment of the seat back support of the present invention, the seat back support includes hinge means for pivotally connecting each of the plurality of juxtaposed strips to adjacent ones of the plurality of juxtaposed strips. Preferably, the plurality of juxtaposed strips and the hinge means comprise a unitary element, the hinge means comprising reduced thickness portions of the unitary element. Preferably, the unitary element comprises plastic.

In accordance with another embodiment of the seat back support of the present invention, the lower edge of the movable support surface is mounted on the seat frame, at least one of the upper and lower edges of the deformable support surface being vertically movable along the seat frame.

In accordance with another embodiment of the present invention, a vehicle seat has been discovered comprising the seat back support set forth above, and including control means for controlling the movement of the deformable support surface between the first and the deformable support surface between the first and second positions. In a preferred embodiment, the lower edge of the deformable support surface is mounted on the seat frame, at least one of the upper and lower edges of the deformable support surface being vertically movable along the seat frame, and including adjustment means for moving the at least one of the upper and lower edges of the deformable support surface along the seat frame.

In accordance with another embodiment of the vehicle seat of the present invention, the deformable support surface includes an upper portion and a lower portion, the upper portion being deformable in a convex configuration away from the seat frame to provide support for the head and neck of an occupant in the seat, and the lower portion providing support for the lumbar region of the occupant.

By providing a back support structure according to the present invention with individual support for substantially all of the individual strips, a positive resistance can be provided against movement and undesired deformation of each of the strips of the support surface. However, since the holding means is movable from a position of engagement to a position of disengagement, good conformity to the shape of the back can still be readily obtained.

If the upper edge of the support surface extends through the neck region of the seat back and into the head region, it will be apparent that the seat back will not only provide optimal support for the back, but also for the neck, which requires a convex-forwardly facing surface.

When considering prior art adjustable seats such as in the aforementioned U.S. Pat. No. 5,120,109 European Application No. 291,298, these have been provided with an additional headrest to achieve support of the head or neck. However, not only does the individual headrest add to the expense, but a further major drawback is that either the area of the neck is well supported or the area of the head is well supported, but no continuous support is provided from the upper part of the back up to the head. Even in U.S. Pat. No. 5,120,1109, where a large number of adjustment members have been used, a lack of support is still apparent between the neck and head support regions. During a collision, this lack of support can lead to severe spinal injuries, such as when the head is forced downwards and the neck backwards despite the presence of a headrest. This is also the case in European Application No. 291,298, since the curvature between the upper part of the back and the head and neck region cannot be adequately copied, and moreover since a relatively large gap will still be present between the top of the seat and the headrest.

Thus, the seat back of the present invention can be applied very advantageously in the art of vehicle seats to solve the additional problem of head and neck support.

BRIEF DESCRIPTION OF THE DRAWINGS

The present invention will now be described in more detail with reference to the following detailed description, which in turn refers to the drawings, in which.

DETAILED DESCRIPTION

Figure 1:
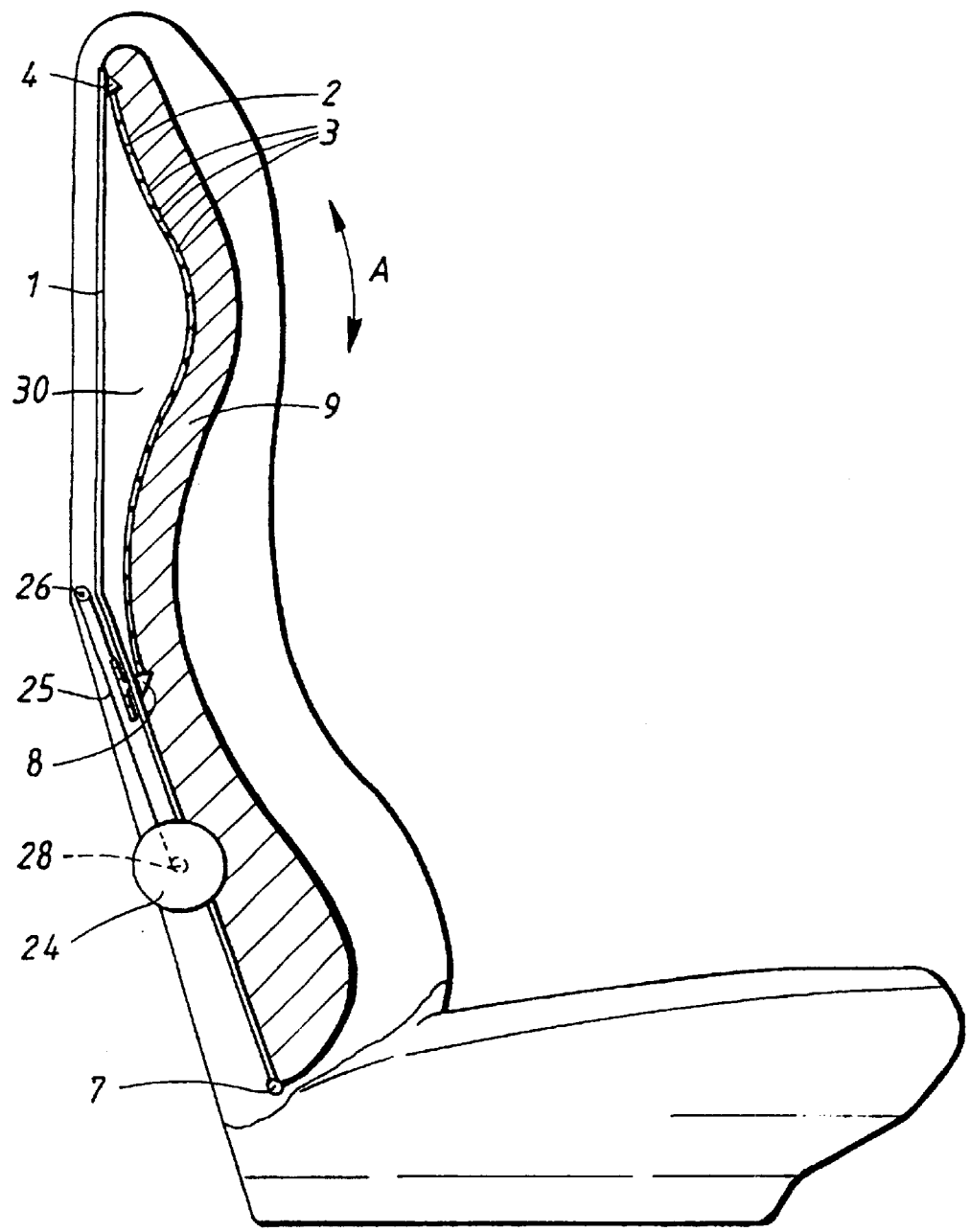
FIG. 1 is a side, elevational, partially cross-sectional view of a vehicle seat with a seat back support structure formed according to an embodiment of the present invention, wherein certain parts have been removed for clarity.

Although a complete vehicle seat has been outlined in FIG. 1, only the upper portion of the seat has been broken away to reveal the back support structure of the present invention. The back support structure comprises a frame 1, which in this embodiment extends from a position proximate the upper end of the seat back, down to a rotation point 7 at the lower end of the seat back. The rotation point would normally be the point around which the whole of the back rest is pivoted in order to recline the seat back. The frame itself may consist of any suitable frame members to which the other parts of the support structure can be attached.

A deformable support surface 2 projecting forwardly of the frame is pivotally attached to the frame I at its upper edge 4 and its lower edge 8 so as to allow for pivoting around a substantially horizontal axis at each end. The support surface itself comprises a plurality of horizontal strips 3 (e.g. of stiff plastic material) which are pivotally joined together along their adjacent horizontal edges. The strips have a height which allows adequate following of the contours of a user's back. A typical height would thus be between about 3 and 8 cm, although other dimensions are feasible.

The pivotal connection between strips 3 can be formed in numerous ways, such as by individual hinges joining adjacent edges of the strips, or by an underlying flexible sheet onto which the strips are fastened. A further possibility could be that the support layer is formed from a single plastic layer with a reduced material depth at short intervals (corresponding to the strip height) to thereby provide a living hinge between each of these thus-formed strips.

The hinges are formed so that the support surface can be deformed convexly and/or concavely towards the front of the seat so as to conform to the contours of a person's back and neck.

The seat will typically be of a length such that the top of the support surface 2 extends through the neck region (region A) and past the center of the back of the head on a 99-percentile occupant (i.e. a very tall person). As can be seen, with the shape of the support surface depicted in FIG. 1, the region "A" will be a convex, forward-facing portion which supports the neck of a user, in particular during a collision but also, if desired, during normal driving. In this way, the upper part of the user's body, including the neck and head, are well supported so that the danger of neck injuries is reduced.

Figure 4:
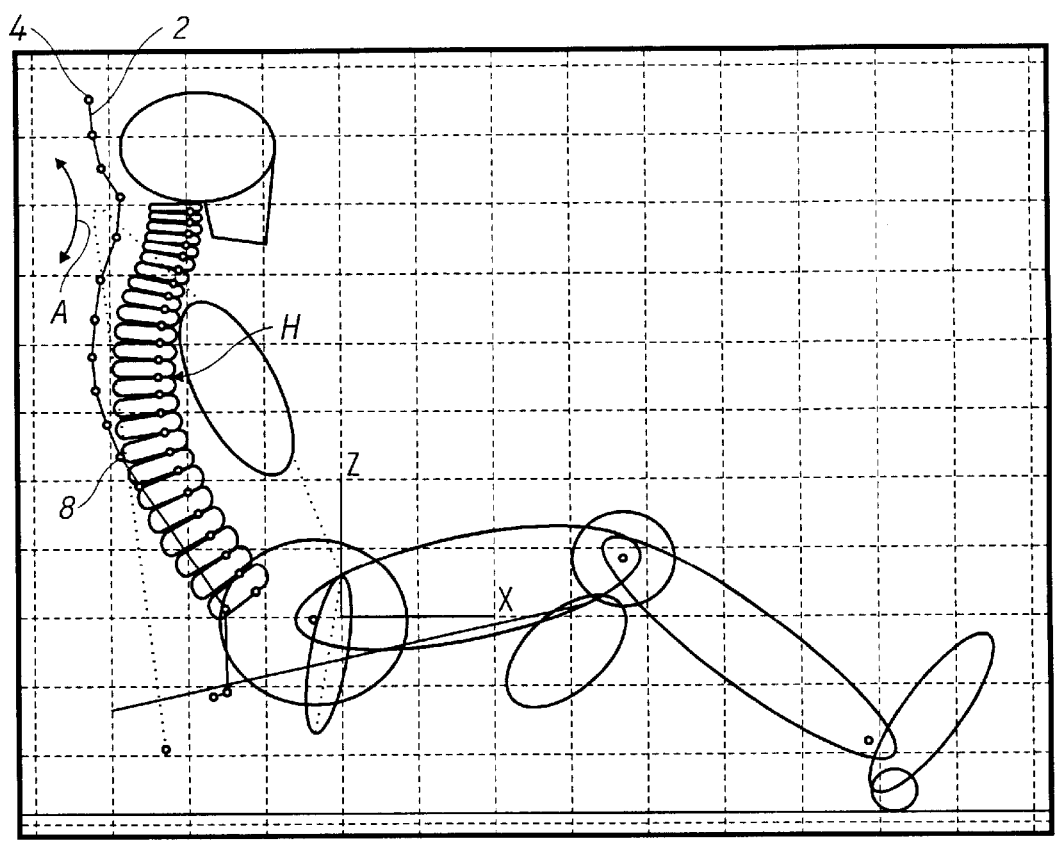
FIG. 4 is a side, schematic view of a passenger seated in normal driving position wherein the seat back incorporates the deformable support surface of the present invention.

A side view of the deformable support surface schematically showing the manner in which it follows the contours of the back of a modeled human passenger "H" to give ideal support is depicted in FIG. 4. In particular, it will be seen how the area "A" adapts very well to the shape of the backbone at the upper part of the neck, and how it also adapts to the head.

An upholstery layer 9 covers the front of the support layer 2 so as to provide padding for the user's back.

Figure 2:
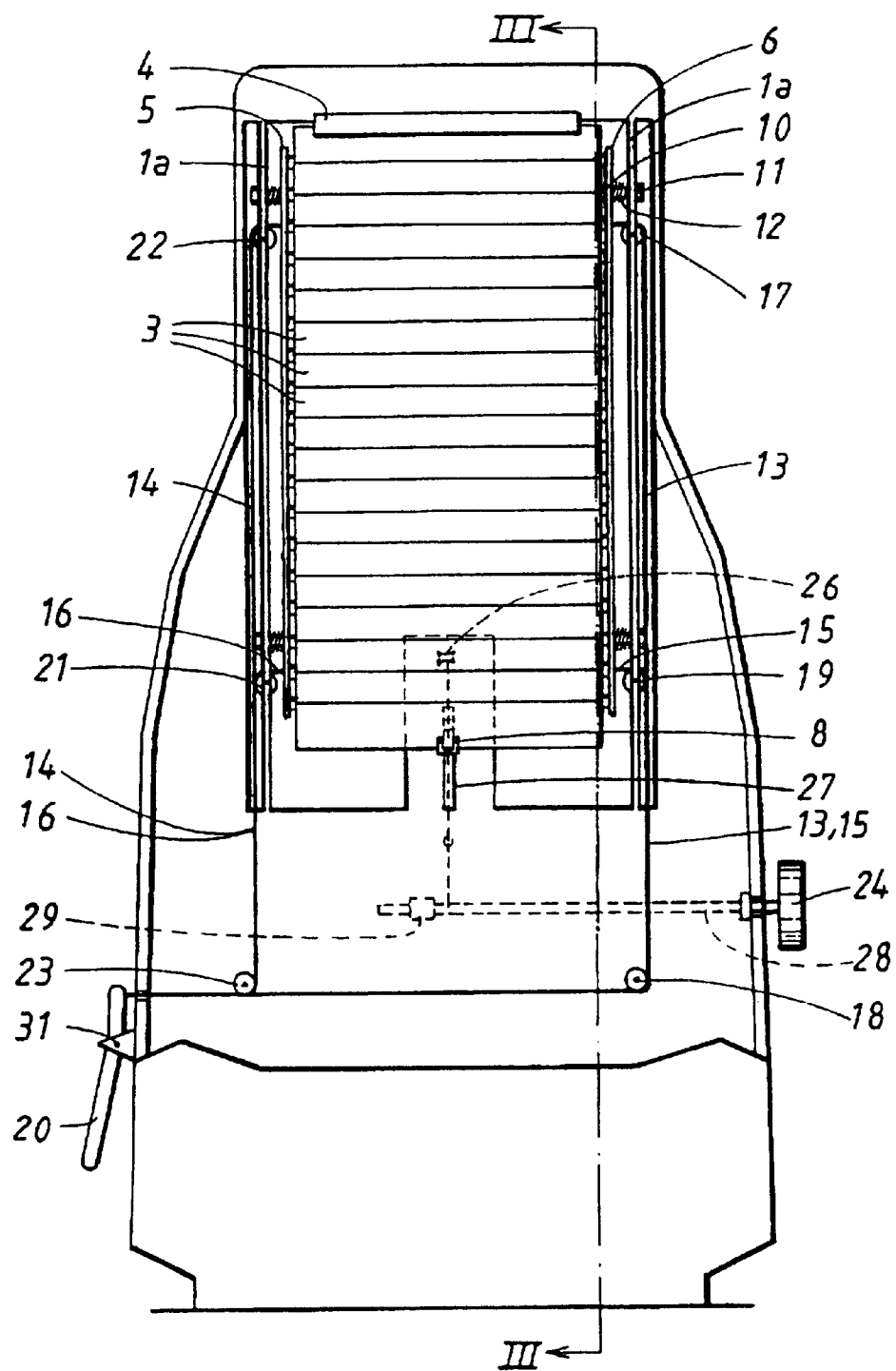
FIG. 2 is a front, elevational view of the seat according to FIG. 1, with the upholstery and covers removed in order to show certain details.
Figure 3:
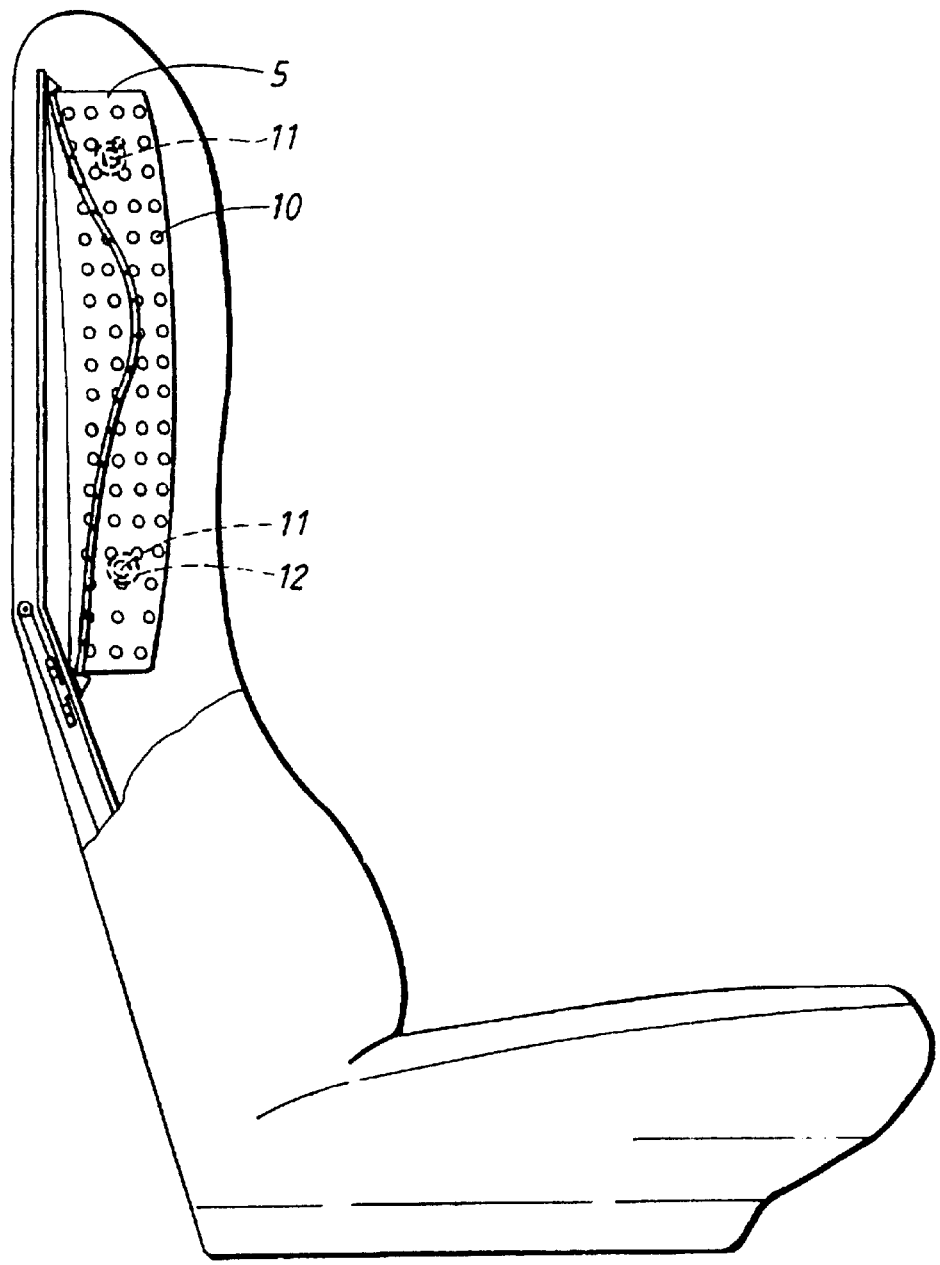
FIG. 3 is a side, elevational, partly broken-away view of the vehicle seat shown in FIG. 2, taken along line III—III in FIG. 2, with the upholstery removed.

In order to hold the deformable support structure in the desired shape or configuration, holding means are provided as shown in FIGS. 2 and 3. In this embodiment, the holding means comprises a pair of opposed vertical plate members, 5 and 6, having a high-friction surface (e.g. formed with rubber protrusions 10) which will be described in more detail below.

In the position shown in FIG. 2, the two plates, 5 and 6, are held in a position of engagement with the respective vertical edges of the support surface 2, thus clamping the support surface 2 therebetween. As can be seen more clearly in FIG. 3, the high-friction surface of the holding means lies in contact with each of the separate strips —3 of the support surface to thus provide a firm engagement of each of the individual strips at either end and preventing their movement towards the rear or front of the seat back.

In order to allow the plates, 5 and 6, to assume an engaged position (as shown) in which they hold the surface 2 in the desired configuration, and a disengaged position where they allow the surface 2 to be conformed to the back of a user, the plates, 5 and 6, are provided with short guide pins 11 attached thereto and compression springs 12 freely arranged around these guide pins. The guide pins project from the rear side of each plate, 5 and 6, and extend through a vertical frame member 1a, and are secured appropriately on the opposite side (e.g. by a split pin or a circlip). The compression springs are fitted between the frame members 1a and the respective plates, 5 and 6, such that they are urged away from the frame member 1a and into contact with the vertical edge of the support surface 2 (formed by the individual vertical edges of each of the strips 3). The spring will preferably be composed of such a number and of such a spring constant as to allow for the forces of a crash without significant movement of the vertical edges of the support surface 2 with respect to the plates, 5 and 6. In a typical collision from the rear, forces due to accelerations of up to 10 g are exerted on the seat, and these should be accommodated.

In this embodiment, guide pins 11 are shown at the upper and lower end regions of each of the plates, although it is clear that the number and location of the guide pins is a matter of design choice.

In order to disengage the plates, 5 and 6, so that the support surface is no longer held in a certain configuration, wires, 13, 14, 15 and 16, and a control lever 20 may be used. Each of the wires is connected to the lever 20 at one end and to the plates, 5 and 6, at the other. Taking wire 13 for example, this wire is attached to the plate 6 and passes through a hole in the frame member 1a, around guide rollers (or pulleys), 17 and 18, before connecting to lever 20. Similarly, wire 15 passes around pulleys 18 and 19. Wires 14 and 16 are similarly arranged on their side to pass around respective pulleys, 21, 22 and 23.

Pulleys 18 and 23 are preferably double V-pulleys having a groove for each wire.

In this manner, a single movement of the lever 20 counterclockwise (as depicted in FIG. 2) around the pivot 31 will cause the plates, 5 and 6, to disengage from contact with each of the individual strips 3. Releasing the lever will allow the springs 12 to urge the plates, 5 and 6, back into contact with each of the plurality of strips 3. If required, a suitable balancing and/or tensioning mechanism can be provided for the wires.

While the holding means and their movement has been defined in terms of wires and plates, other suitable holding means may be envisioned as long as they allow engagement and disengagement to be effected. For example, hydraulic pressure acting on suitable means and controlled by a hand-operated valve may be used to provide an engaging/disengaging force.

In order to better provide for different seating positions and different bodily dimensions, the lower edge 8 (formed here by a guide block 8) of the deformable support surface 2 can be attached to the frame in a vertically movable manner. Alternatively, or additionally, the top edge (4) could be movable. In this embodiment, vertical movement is provided by the lowermost strip of the support surface 2 being attached to a guide block 8 which projects through a vertical guide slot 27 in the seat frame 1. The guide block is attached to a wire 25 which passes over a small pulley 26 and then into connection with a rotatable shaft 28. The shaft 28 is connected outside the seat frame and upholstery to an adjustment wheel 24, which can be blocked against rotation by suitable means acting on the shaft. Such means are known per se and could, for example, be disengaged when the shaft 28 is moved outwards (allowing it to be turned by means of the wheel 24) and engaged by releasing the wheel 24 (allowing the shaft 28 to move inwards again), to thus block movement of the wheel 24.

When the wheel 24 is turned, the wire 25 is wound around (or unwound from) the shaft 28, and the lower Edge 8 of the support surface moves upwardly or downwardly, depending on the direction of rotation of the wheel 24. Servo-motorized operation of the wheel is, of course, a further possibility.

By upward movement of the lower edge 8, the volume of space 30 between the support surface 2 and the frame I changes (this is most clearly visible in FIG. 1). In this manner, greater adjustability to the needs of the individual back can be obtained.

In a typical situation, the seat back will be part of a vehicle seat. A passenger sitting in the seat will adjust the seat, for example, as follows. The passenger will first sit down and assume the normal driving posture. By movement of lever 20, the holding means, 5 and 6, will be disengaged from the support surface 2, thus allowing the support surface 2 to be freely conformable to the shape of the user's back between the upper and lower edges of surface 2. Since the user's back will be pressed against the seat back, the contours of the back will be closely matched by the support surface. Moreover, in the neck region of the seat, the surface 2 will deform in a convex manner towards the front of the seat and will thus conform to the neck and lower head portion of the user.

When in a position providing good support, the lever 20 is released and the support surface is locked against further movement by means of the plates, 5 and 6. The user will thus be provided with well-conforming back, neck and head support, not only in the event of a crash but even during ordinary driving if this is desired. Should the user not wish to have actual contact in the head and neck region during normal driving, the support surface 2 can be adjusted with the user's head leaning backwards against the seat back, which will reduce the length of the convex region in area "A" and leave the user's head a few centimeters from the neck and head support in any event, any rearward collisions will cause the head and neck to move back to a well-supported position.

If insufficient (or too much) volume 30 is present in order to provide a convex region "A" conforming sufficiently to the shoulder/neck/head region of the user, the lever 24 may be turned to increase (or decrease) the volume of space. However, in order to move the lever 24, the plates, 5 and 6, must normally be in a disengaged position. For this purpose, it may be appropriate to have the lever 20 and wheel 24 on opposite sides of the seat (as shown in the figure) for operation simultaneously with separate hands. However, the lever and wheel may be on the same side of the seat. Alternatively, movement of the wheel 24 can automatically cause movement of the holding means to a disengaged position. In most cases, however, the volume 30 will already be suitable for the vast majority of users and the conformity of the support surface 2 will only need to be changed, as described above, by using lever 20.

Thus, it can be seen that in most cases, merely by sitting in the seat and operating one lever (lever 20), the seat back can be adjusted to provide good back, neck and head support.

In a further embodiment, the lumbar region of the seat back may instead be provided with an arrangement similar to that described above, or even by a separate arrangement in addition to that described above. Additionally in a still further embodiment, lumbar is support could be provided by extending the arrangement described above down into the lumbar region of the seat so as to provide a continuous support surface for the whole of the seat back. However, in terms of accident injury protection, the lower part of the back is not at such a great risk as the upper part of the back.

The plates, 5 and 6, are formed with a width (left to right as in FIG. 3) which covers the usable range of substantially all of the strips 3 from the fully flattened state (lower edge 8 being as far down as possible ) to the maximum volume state (lower edge 8 being as high as possible). As shown in FIG. 3, the plate 5 may have a somewhat curved shape to take account of the maximum degree of curvature of surface 2 at the upper and middle regions of the seat back. Different shape plates can of course be provided.

The plates, 5 and 6, may also be replaced by other suitable holding means which can cause a clamping or holding force to be applied to all of the strips individually. However, a plate-like member (i.e. a member that has a substantially flat contact surface) is preferred since this is cheap, robust and effective.

The high friction means denoted as 10 in the figures may be of any suitable type, although a patterned rubber facing (e.g. with small projections or dimples) or an abrasive surface is suitable.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A seat back support comprising:
    a seat frame;
    a deformible support surface having an upper edge and a lower edge, said upper edge being mounted oh said seat frame, and said deformable support surface comprising a plurality of juxtaposed strips pivotally mounted with respect to each other; and
    holding means connected to said support surface for maintaining said deformable support surface in a predetermined orientation, said holding means being movable between a first position wherein said holding means engages said plurality of juxtaposed strips to maintain said deformable support surface in said predetermined orientation and a second position wherein said holding means is disengaged from said deformable support surface and said deformable support surface is movable into a different orientation.

2. The seat back support of claim 1 wherein said deformable support surface includes an upper portion and a lower portion, said upper portion being deformable in a convex configuration away from said seat frame to provide support for the head of an occupant in said seat.

3. The seat back support of claim 1 wherein said plurality of juxtaposed strips includes substantially vertical edge portions, said holding means adapted to engage said substantially vertical edge portions in said predetermined orientation.

4. The seat back support of claim 3 wherein said holding means comprises at least one plate having a high friction surface disposed thereon facing at least one of said substantially vertical edge portions.

5. The seat back support of claim 4 including biasing means for biasing said holding means into said first position, and actuation means for moving said holding means into said second position.

6. The seat back support of claim 1 including hinge means for pivotally connecting each of said plurality of juxtaposed strips to adjacent ones of said plurality of juxtaposed strips.

7. The seat back support of claim 6 wherein said plurality of juxtaposed strips and said hinge means comprise a unitary element, said hinge means comprising reduced thickness portions of said unitary element.

8. The seat back support of claim 7 wherein said unitary element comprises plastic.

9. The seat back support of claim 1 wherein said lower edge of said movable support surface is mounted on said seat frame, at least one of said upper and lower edges of said deformable support surface being vertically movable along said seat frame.

10. A vehicle seat comprising the seat back support of claim 1, and including control means for controlling the movement of said deformable support surface between said first and second positions.

11. The vehicle seat of claim 10 wherein said lower edge of said deformable support surface is mounted on said seat frame, at least one of said upper and lower edges of said deformable support surface being vertically movable along said seat frame, and including adjustment means for moving said at least one of said upper and lower edges of said deformable support surface along said seat frame.

12. The vehicle seat of claim 11 wherein said deformable support surface includes an upper portion and a lower portion, said upper portion being deformable in a convex configuration away from said seat frame to provide support for the head and neck of an occupant in said seat, and said lower portion providing support for the lumbar region of said occupant.

* * * * *